United States Patent [19]

Lahoda et al.

[11] Patent Number: 4,490,225
[45] Date of Patent: Dec. 25, 1984

[54] SEPARATION OF ISOTOPES OF ZIRCONIUM

[75] Inventors: Edward J. Lahoda, Edgewood; Sharon L. Weisberg, Pittsburgh; Robert W. White, Monroeville, all of Pa.

[73] Assignee: Westinghouse Electric Corp., Pittsburgh, Pa.

[21] Appl. No.: 415,094

[22] Filed: Sep. 7, 1982

[51] Int. Cl.$^3$ .............................................. B01D 59/00
[52] U.S. Cl. .................................... 204/158 R; 75/84
[58] Field of Search ...................... 204/157.1 R, 158; 75/84 R

[56] References Cited

U.S. PATENT DOCUMENTS

| | | |
|---|---|---|
| 3,443,087 | 5/1969 | Robieux et al. |
| 3,937,956 | 2/1976 | Lyon |
| 3,941,670 | 3/1976 | Pratt |
| 4,020,350 | 4/1977 | Ducas |
| 4,024,217 | 5/1977 | Wexler et al. |
| 4,025,790 | 5/1977 | Jetter et al. |
| 4,096,046 | 6/1978 | Niemann |
| 4,097,384 | 6/1978 | Coleman et al. ............. 204/157.1 R |
| 4,166,951 | 9/1979 | Garbuny |
| 4,389,292 | 6/1983 | Phillips et al. ................. 204/158 R |

OTHER PUBLICATIONS

Miller et al., "Infrared Photochemistry of a Volatile Uranium Compound . . . " ©1979 Amer. Chem. Soc., pp. 1036, 1037.

Dewitt, "A Survey of Large-Scale Isotope Applications" Mound Lab.-U.S. Gov't. Contract EY-76-C-04-0053, 1977.

Primary Examiner—Deborah L. Kyle
Attorney, Agent, or Firm—Z. L. Dermer

[57] ABSTRACT

Vapor of dicyclopentadienyl zirconium dicyanate is irradiated by a laser beam of a $CO_2$ laser tuned to the stretching frequency of the $^SZr$-O-C bond of the dicyanate where $^SZr$ is a selected isotope of zirconium. The excited component of the irradiated dicyanate including the $^SZr$ is decomposed and is separated from the remainder. The dicyanate is readily prepared in large quantities, resists hydrolysis, sublimes at a temperature well below its dissociation temperature, and has a lower molecular weight than other proposed compounds such as dicyclopentadienyl zirconium diisopropoxide, and dicyclopentadienyl zirconium-di-tert-butoxide 2 Claims, 4 Drawing Figures

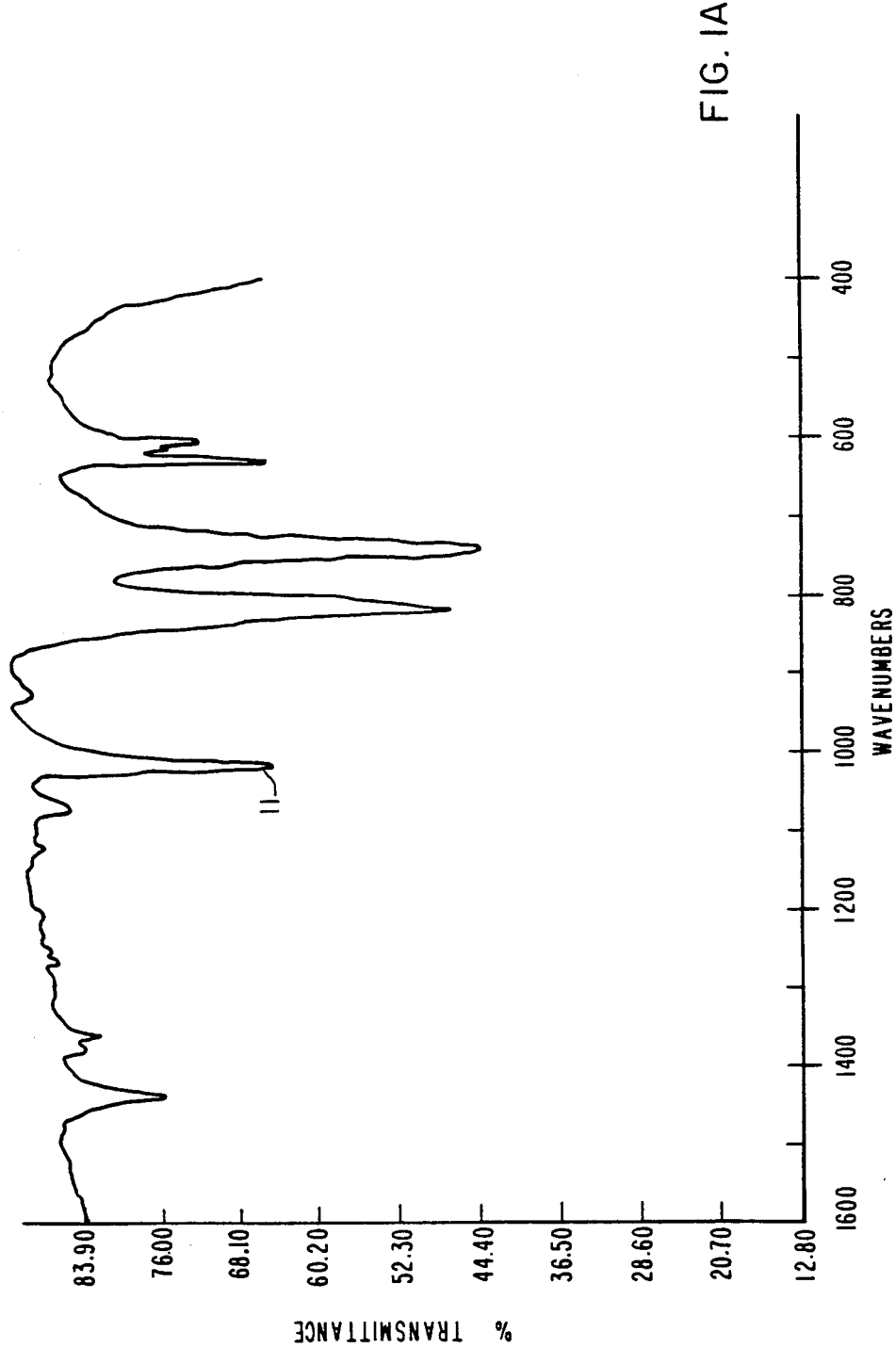

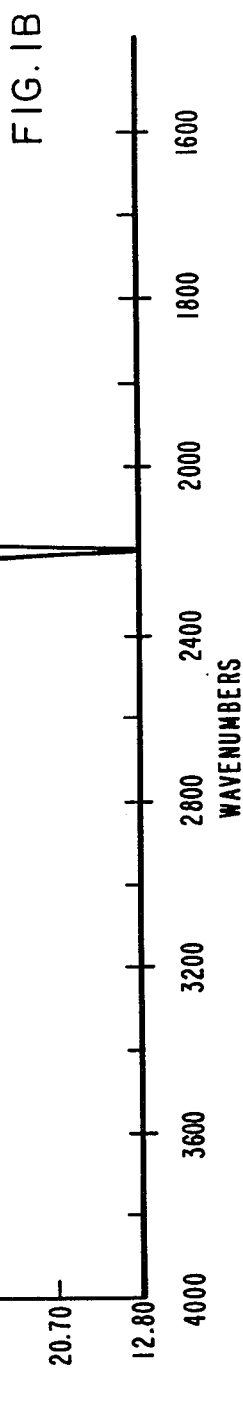
FIG. IB

SEPARATION OF ISOTOPES OF ZIRCONIUM

REFERENCE TO RELATED APPLICATIONS

This application relates to, and incorporates by reference:

An application Ser. No. 411,221 filed Aug. 25, 1982 to John D. Feichtner et al. for Separation of Isotopes of Zirconium (herein Feichtner); and An application Ser. No. 415,095 filed Sept. 7, 1982 to Robert J. Nadalin et al. for Separation of Isotopes of Zirconium (herein Nadalin).

Feichtner and Nadalin are assigned to Westinghouse Electric Corporation.

BACKGROUND OF THE INVENTION

This invention relates to the separation of the isotopes of zirconium predominantly for the fabrication of parts or components of a nuclear reactor. The invention has particular relationship to the separation of the zirconium isotopes by irradiating vapor of a zirconium-containing compound with a laser beam tuned to the component of the selected isotope and to the discovery of a compound uniquely suitable for such separation. An isotope of zirconium which is selected for separation is herein generally designated $S_{Zr}$.

Feichtner teaches the separation of isotopes by laser irradiation of certain zirconium alkoxides. It has been found that while such alkoxides have properties which are uniquely suitable for the separation process, they are subject to hydrolysis and their processing requires precautions against hydrolysis. Nadalin teaches the use for isotope separation of the dicyclopentadienyl zirconium alkoxide compounds dicyclopentadienyl zirconium dichloride, (herein DZD), dicyclopentadienyl zirconium diisopropoxide (herein DZDI) and dicyclopentadienyl zirconium-di-tert-butoxide (herein DZDB). These compounds are not at all or are less subject to hydrolysis than the tetra alkoxides of zirconium disclosed in Feichtner. The DZD is available commercially or is readily prepared from zirconium tetrachloride. However, for isotope separation, DZD has the disadvantage that it includes chlorine. Chlorine has isotopes $^{35}Cl$, whose abundance is about 75.4% and $^{37}Cl$, whose abundance is about 24.6%. The chlorine isotopes militate against the effective separation of the zirconium isotopes. DZD serves as a starting material for the preparation of DZDI and DZDB which do not include chlorine and can serve for the effective separation of zirconium isotopes. However, difficulty is involved in preparing and purifying the DZDI and the DZDB. The yield of pure DZDI or DZDB in the preparation of these compounds from DZD is only about 10–15%. The cost of preparing these compounds is high.

It is an object of this invention to overcome the above-described disadvantage of the dicyclopentadienyl alkoxides and to provide a volatile zirconium compound suitable for use in the separation of zirconium isotopes which compound can be prepared in substantial quantities with high purity and at relatively low cost.

SUMMARY OF THE INVENTION

It has been found that dicyclopentadienyl zirconium dicyanate (herein DZDC) meets the above-stated requirements. The structured formula for DZDC is:

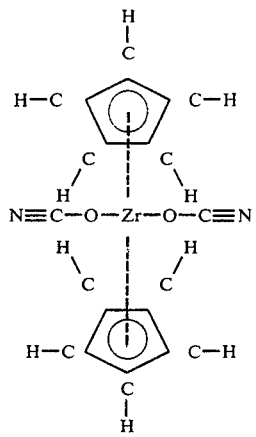

In the molecule the Zr atom is sandwiched between the two cyclopentadienyl radicals. The formula may be written $(Cp)_2Zr(OCN)_2$. Cp is the radical $C_5H_5$.

The starting compound for preparing DZDC is zirconium tetrachloride $ZrCl_4$. The tetrachloride is reacted with sodium pentadianide in the solvent tetrahydrofuran to produce DZD. The reaction is:

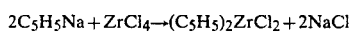

The DZD is reacted with sodium cyanate to produce the DZDC.

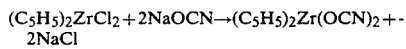

Specifically, the DZD is dissolved in tetrahydrofuran. Then twice the stoichiometric quantity of sodium cyanate is added and the resulting material is stirred for a long interval, typically 6 hours. The sodium chloride precipitates and is filtered off. The solvent is then evaporated under a vacuum leaving DZDC. The preparation is carried out at room temperature. During the preparation an intermediate compound di-cyclopentadienyl zirconium mono chloride monocyanate, $(Cp)_2ZrClOCN$, is produced. It has been found that the residue of this mono chloride mono cyanate in the solvent and in the ultimate product is minimal. The ratio of DZDC to the mono chloride mono cyanate in the solvent is 11:1 and this ratio after the solvent is evaporated is 58:1. The yield of pure DZDC in the final product exceeds 65%. Large quantities, pounds, of the DZDC can be prepared even by laboratory batch process.

The DZDC is ideal for isotope separation by laser irradiation. Its sublimation temperature is between 170° C. and 180° C. while its decomposition temperature is between 400° C. and 500° C., more precisely between, 450° C. and 460° C. Its Zr—O—C (sometimes written C—O(Zr)) bond vibrates in the range of 1070 cm$^{-1}$ wave number. The CO$_2$ laser produces radiation in this region of the infrared spectrum. The DZDC is not subject to hydrolysis. It has a substantially lower molecular weight than the DCDB and DCDI and therefore is more readily processed through a hypersonic nozzle. In addition, the Zr—O—C—bond absorption is not interfered with by other bond absorption, i.e., the bond absorption for the Zr—O—C (1070 cm$^{-1}$) does not overlap the absorption arising from any other bonds in the molecule.

Since the chemical properties of hafnium are very similar to the chemical properties of zirconium dicyclopentadienyl hafnium cyanate, uniquely suitable for isotope separation, can be prepared. This material would serve an important purpose in the removal of hafnium from zirconium depleted in $^{91}Zr$.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIGS. 1A and 1B together are a graph presenting the infrared absorption spectrum of DZDC;

DESCRIPTION OF THE PREFERRED EMBODIMENTS

FIG. 1 is based on infrared absorption data derived by passing infrared light through a thin pellet of DZDC in KBr and measuring the percent of the incident light transmitted at a different wave number. The percent of light transmitted is plotted vertically and the wave number in $cm^{-1}$ is plotted horizontally. FIGS. 1A and 1B show that DZDC manifests the usual absorption bands for cyclopentadienyl compounds described in Gray, D. R., and C. H. Brubaker, Jr., *Inorganic Chemistry*, 10(10), 2143, (1971) and Burmeister, J. L., et al., *Inorganic Chemistry*, 9(1), 58, (1970). The bands at 3100, 1440, 1020, and 840–810 $cm^{-1}$ result from carbon-hydrogen stretch, carbon-carbon double bond stretch and carbon-hydrogen in-and-out-of- plane bending vibrations. There is also the strong band at 2200 $cm^{-1}$ indicating the C—N triple bond. Carbon-oxygen stretching frequencies have been assigned to the bands at 1252 $cm^{-1}$ and 1070 $cm^{-1}$; these assignments agree with the literature (see Burmeister). The band 11 at 1070 $cm^{-1}$ is within the output range of a $CO_2$ laser which is the most likely laser to be used in the laser isotope separation. The bending of the cyanate group occurs in the region 630–600 $cm^{-1}$. Finally, the zirconium-oxygen bending frequency is assigned to the absorption at 740 $cm^{-1}$. The stretching frequencies of these two molecules should appear at a much lower wave number in part of the spectrum which has not been investigated. Any absorption caused by the bond formed during hydrolysis, Zr—O—Zr would appear at 752 $cm^{-1}$ and 779 $cm^{-1}$, neither of which appears in the spectrum. This shows that hydrolysis did not occur.

Figure 2:
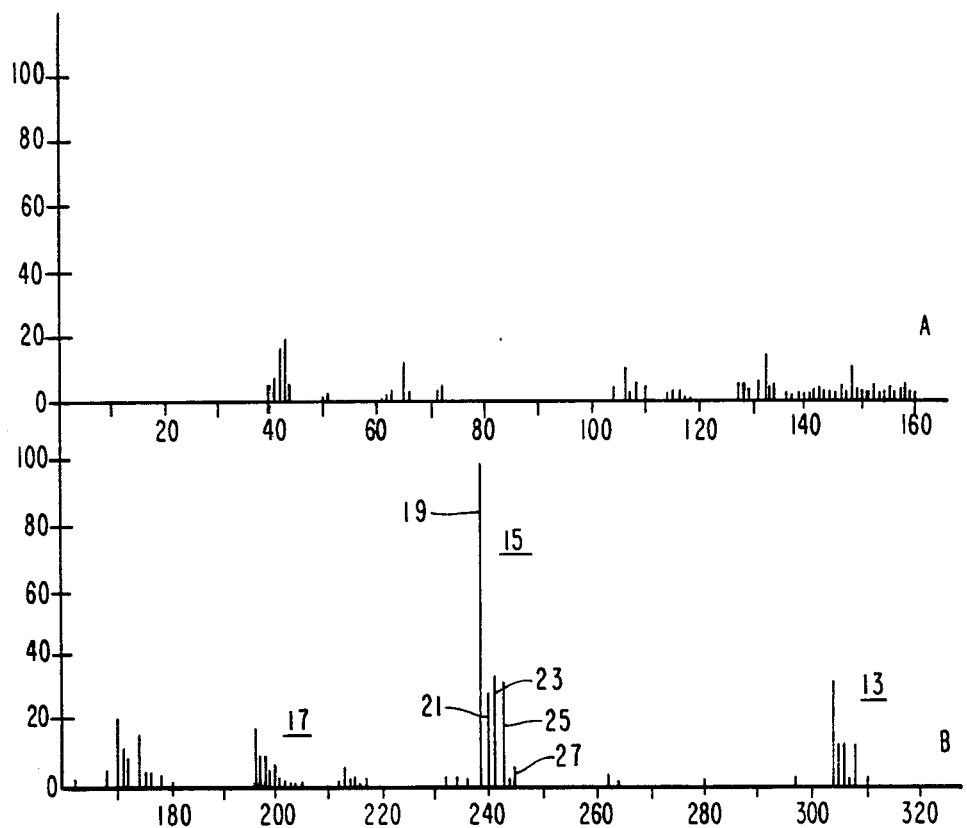
FIG. 2 is a reproduction of a mass spectrograph produced with the DZDC.

FIG. 2 shows a mass spectrograph produced with DZDC vapor. The spectrograph is shown in two sections A and B. In each section the amplitude of the derived indications are plotted vertically in percent of maximum indication and the molecular mass is plotted horizontally. In section A the indications for molecular masses from 0 to 160 are plotted and in section B the indications for masses from 160 to 320 are plotted. FIG. 2 shows the characteristic mass spectrograph for zirconium including the five lines for the isotopes $^{90}Zr$, $^{91}Zr$, $^{92}Zr$, $^{94}Zr$, $^{96}Zr$ whose abundance in percent are 51.46, 11.23, 17.11, 17.40 and 2.8, respectively. The group of lines 13 in the right starting at about 304 are the indications for the DZDC molecule as a whole. The group 15 in the center starting at about 239 are the indications for a fragment of the molecule. Apparently, this fragment resulted from the loss of a ($C_5H_5$) radical by the molecule. The group 17 on the left at about 196 are the indications for another fragment of the molecule. As best shown in the group 15 the isotope indications correspond to the abundance. The line 19, having a magnitude of about 100, is derived from $^{90}Zr$, the line 21, with a magnitude of about 30, is derived from $^{91}Zr$, the line 23, having a magnitude of about 34, from $^{92}Zr$, the line 25, having a magnitude of about 33, from $^{94}Zr$, and the line 27, having a magnitude of about 6, from $^{96}Zr$.

The technique of producing mass spectra can also be used to give an indication of the volatility of a sample since the analyses are conducted with increasing sample temperature. Typically, the mass spectrograph analysis starts with the sample at 50° C. The sample is maintained at 50° C. for 3 minutes and then the temperature is increased by 5C.° every 1 minute. In all cases, the product was first detected on the spectrum at about 170° C. This temperature agrees with a thermal gravimetric analysis conducted in which significant weight loss from the sample occurred at temperatures of about 160°–170° C. Some weight loss, resulting from the vapor pressure of the material, was apparent at temperatures as low as 80° C. Decomposition is not expected to occur at temperatures less than 400°–500° C. based on a differential thermal analysis. The compound stability in the laser isotope separation feed system is not a problem.

Figure 3:
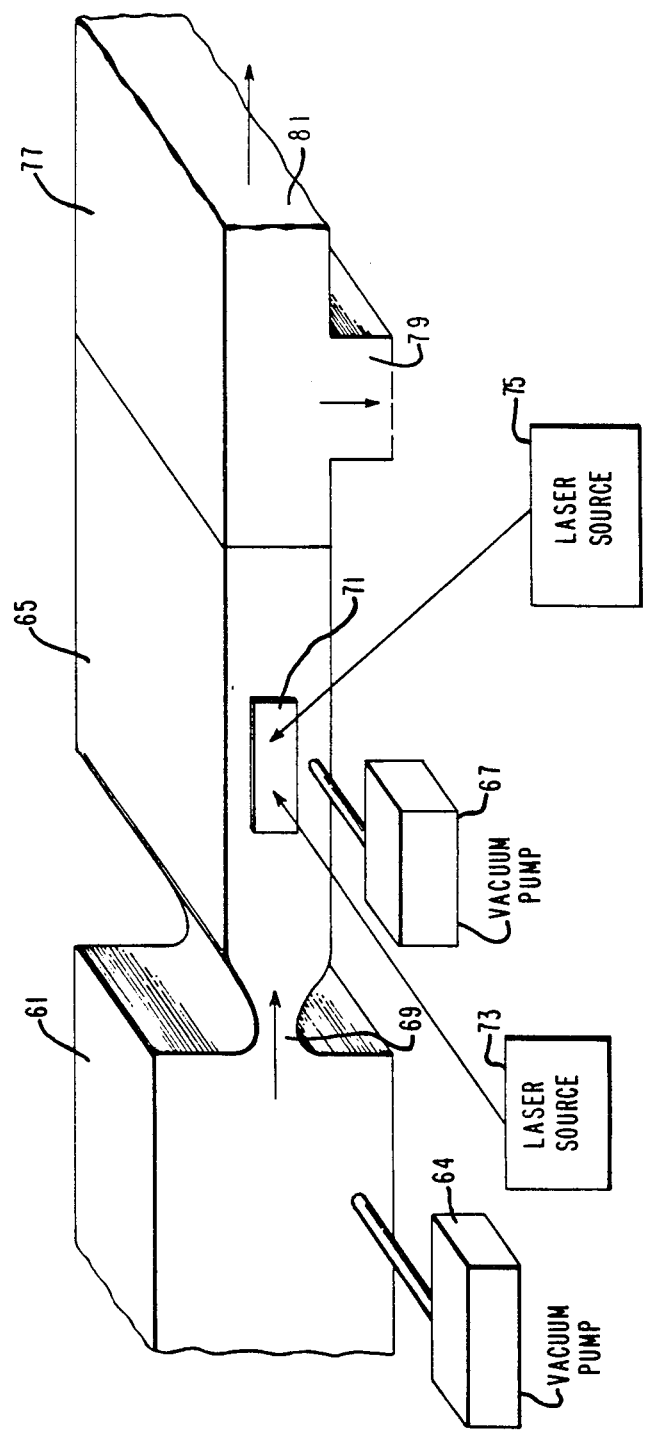
FIG. 3 is a diagrammatic view of apparatus for separating the isotopes of DZDC by irradiation.

The apparatus shown in FIG. 3 is similar to like apparatus in Feichtner and Nadalin. The apparatus includes a chamber 61 within which there is a vessel (not shown) including DZDC powder. A heater (not shown) is provided for heating the vessel or the chamber 61. Initially the chamber may be evacuated by a pump 64 and then swept by a non-reacting or inert gas such as nitrogen or helium. The DZDC is then vaporized and the vapor is swept by the nitrogen or helium into reaction chamber 65. The reaction chamber 65 is maintained evacuated by pump 67. The vapor and gas pass through nozzle 69 and expand adiabatically into the reaction chamber. The expansion reduces the temperature of the gas and vapor limiting the quantum states of the bonds of the vapor. The reaction chamber 65 has a window 71 permeable to infrared light. Infrared light from laser source 73 is transmitted through the window and irradiates the vapor which is passing through the reaction chamber in a stream. The energy from the gas and vapor as it is cooled by the adiabatic expansion is converted into translational kinetic energy for the gas and vapor molecules. The laser source 73 is operated in the 1070 $cm^{-1}$ wave number range and is tuned to the vibration of the $^SZr$—O—C bond of the selected zirconium isotope $^SZr$. The laser may also be Raman shifted and operated at the frequency of vibration, 740 $cm^{-1}$ wave number, of the Zr—O bond. The vapor may also be irradiated by an additional source or additional sources 75. These sources 75 emit radiation of a different frequency than the laser 73. The sources 75 may emit infrared or ultraviolet radiation or both. The additional sources enhance the excitation of the selected component of the vapor. The processed vapor passes into separation chamber 77. The excited component which is usually a powder passes out through channel 79. The unexcited vapor passes out through channel 81. If the material derived from channel 79 is enriched in a zirconium isotope, for example, $^{90}Zr$, having a low neutron-absorption cross section, the zirconium from this material is used to fabricate nuclear reactor parts. If the material derived from channel 81 is depleted in zirconium, for example, $^{91}Zr$, having a high neutron-absorption cross section, the parts are fabricated from material derived from this channel.

While preferred practice of this invention has been disclosed herein, many modifications thereof are feasible. This invention is not to be restricted except insofar as is necessitated by the spirit of the prior art.

We claim:

1. The method of producing zirconium having a low neutron-absorption cross section for use in parts of a nuclear reactor, the said method comprising producing a material of dicyclopentadienyl zirconium dicyanate, $(Cp)_2Zr(OCN)_2$, said material containing a plurality of isotopes of zirconium, subjecting the vapor of said material to radiation emitted from a carbon-dioxide laser tuned to the vibration of an excitable bond of a selected $^SZr$ isotope of said material, whereby the $^SZr$ component of said material is decomposed; separating the product of the decomposition of the $^SZr$ component from the remainder of said material, and forming the said parts of that one, of the separated $^SZr$ component of said material or of the remainder of said material, in which the zirconium has the minimum neutron-absorption cross section.

2. The method of claim 1 wherein the vapor is produced by heating the material to a temperature of between 170° C. and 180° C.

* * * * *